United States Patent [19]
Wadhams

[11] Patent Number: 5,225,618
[45] Date of Patent: Jul. 6, 1993

[54] METHOD AND APPARATUS FOR STUDYING MUSIC

[76] Inventor: Wayne Wadhams, 73 Hemenway St., No. 508, Boston, Mass. 02115

[21] Appl. No.: 801,649

[22] Filed: Dec. 2, 1991

Related U.S. Application Data

[62] Division of Ser. No. 395,328, Aug. 7, 1989.

[51] Int. Cl.$^5$ .............................................. G10H 1/36
[52] U.S. Cl. ..................................... 84/602; 84/645; 84/604; 84/634; 84/462; 84/615
[58] Field of Search ................................ 84/601–607, 84/609, 634, 645, 649, 461–463, 470 R, 470 P

[56] References Cited

U.S. PATENT DOCUMENTS

| | | | |
|---|---|---|---|
| 3,781,452 | 12/1973 | Vauclain | 84/609 |
| 3,955,466 | 5/1976 | Goldmark | 84/470 |
| 4,694,724 | 9/1987 | Kikumoto et al. | 84/DIG. 29 |
| 4,696,216 | 9/1987 | Asahi et al. | 84/478 X |
| 4,802,152 | 1/1989 | Markovoort et al. | 369/32 |
| 4,942,551 | 7/1990 | Klappert et al. | 364/900 |
| 4,982,643 | 1/1991 | Minamitaka | 84/613 |
| 5,020,410 | 6/1991 | Sasaki | 84/645 X |
| 5,050,216 | 9/1991 | Hanzawa et al. | 381/62 |
| 5,054,360 | 10/1991 | Lisle et al. | 84/645 |

Primary Examiner—William M. Shoop, Jr.
Assistant Examiner—Brian Sircus
Attorney, Agent, or Firm—Wolf, Greenfield and Sacks

[57] ABSTRACT

A method and apparatus for studying music includes a music analysis system, which in conjunction with a proprietary storage medium, enables the user to comparatively analyze a recorded musical performance alone or in synchronization with a modifiable synthesized version of the same musical performance. The system further provides facilities for defining specific segments of the original and synthesized performances as well as means for re-orchestrating the synthesized performance, adding additional instrumental parts to the synthesized performance, changing the tempo of the synthesized performance on playback, and electronically displaying and/or printing the score of the synthesized performance. The invention further includes a proprietary storage medium containing data representative of the original musical performance, digital data representative of the synthesized performance and timing data. The invention further discloses a method for generating the data stored on the proprietary storage medium.

31 Claims, 10 Drawing Sheets

METHOD AND APPARATUS FOR STUDYING MUSIC

This application is a division of application Ser. No. 07/395,328 filed on Aug. 17, 1989.

FIELD OF THE INVENTION

The present invention relates to the field of music analysis and teaching, and more specifically, to a method and apparatus for comparative analysis of an original musical recording with a synthetically generated version of the same recording. In particular, the apparatus of the present invention enables a user to play and compare a musical recording, having a number of instrumental parts, with a synthetically generated version of the same recording in which the individual instrumental parts have been recorded separately and are therefore individually accessible.

BACKGROUND OF THE INVENTION

Sound recordings, and in particular, musical performances having a number of instrumental parts, are widely available on a large number of mediums. These mediums include traditional phonograph records and magnetic tapes, as well as optical compact discs and magnetic disks. The sound recording is stored on these mediums as a composite audio signal which represents the sum total of all individual component parts of the recording. In the case of a musical performance, the component instrumental parts are generally performed in synchronization and the composite musical performance recorded as a single audio signal that is stored in either an analog or digital format.

Recorded musical performances are used extensively in the teaching and analysis of musical composition, performance and conducting. Many music students desiring to learn an instrumental part in a musical performance still rely on the conventional technique of visually following a copy of the musical score in real time with a recorded performance of the same musical score. Other students attempt to "play along" with the recorded performance of the score at the passage(s) which they desire to learn. Unfortunately, few students can read an orchestral or big band score in real time while listening to a recorded performance. Even fewer students can perform an instrumental part from an orchestral or big band score in real time while listening to a recorded performance. "Practice" records, in which one instrumental part from the musical performance has been eliminated, are available to allow the music student to play along with the recording and perform the missing instrumental part. Unfortunately such records are available for only a limited number of musical performances and with even fewer instrumental combinations.

The above techniques can be frustrating, particularly if a musical passage is difficult, since few playback devices provide facilities for changing the tempo of the recorded performance, and then only with a corresponding change in pitch. Further, the listener is unable to selectively listen to individual parts of the musical performance without hearing all instrumental parts simultaneously. Finally, the listener is bound to the instrumentation and orchestration of the musical performance as recorded and, at best, can only imagine how the score would sound as played by different musical instruments.

It should be noted, that during the conventional recording of an analog audio signal representing a musical performance, the individual instrumental parts can be each recorded on separate tracks of a magnetic tape and can be individually listened to or muted to facilitate audio mixing and recording of the composite audio signal. However, this technique requires a multitrack master tape, each track containing an individual recording of an instrumental part, a multitrack tape deck and a multitrack mixing console. The above equipment is typically available only in well equipped audio recording studios which are usually inaccessible to most music students. Multitrack master tapes are expensive to reproduce, are seldom, if ever, reproduced and are thus not available for student use even of if the equipment were available. Consequently, such a technique is impractical and far too expensive for wide spread use as a method of teaching or analyzing music composition and performance. Moreover, classical music is seldom recorded via multitrack method. Thus, few compositions normally used in music education would be available for study by this method, even if well equipped studios were accessible.

Accordingly it is an object of present invention to provide a method and apparatus for synthetically generating, storing and synchronizing a collection of individual instrumental parts along with a composite pre existing recording of a musical performance of the same instrumental parts.

Another object of the present invention is to provide a method and apparatus which enables a user to listen to a recorded musical performance, stored as a composite audio signal comprised of all instrumental parts, in conjunction with a performance of one or all parts of the same musical score stored as a collection of individually recorded instrumental parts.

A further object of the present invention is to provide a means by which a user can dissect a synthesized performance to analyze individual instrumental parts, repeating sections of the synthesized performance at will and adding other instrumental parts until he understands how the score is built, and possibly how it would sound if re orchestrated for different instruments.

Another object of the present invention is to provide a method of studying music in which the student may utilize a synthesized version of a recorded performance to assist him in studying an instrumental part wherein the student can select various sections of the instrumental part for listening and playing at a tempo with which the student feels comfortable.

A further object of the present invention is to provide an apparatus which enables the user to listen to a synthesized version of a musical performance in synchronization with an original recording of the same performance or at a tempo which is different from that of the original recorded performance.

Another object of the present invention is to provide a means by which the user may select a segment of a synthesized performance and repeat it at will with various permutations and combinations of such instrumental parts.

A further object of the present invention is to provide a means by which the user may selectively mute individual instrumental parts of the synthesized performance with or without synchronization of the synthesized performance to the originally recorded performance.

Yet another object of the present invention is to provide an apparatus which enables a user to modify, store or augment a synthesized performance and replay such a modified version of the synthesized performance in synchronization with the originally recorded performance.

Still a further object of the present invention is to provide a storage medium containing a composite audio signal, representing a musical performance, timing and synchronization information, and a synthesized musical performance, comprised of synthetically generated, individually stored instrumental parts.

SUMMARY OF THE INVENTION

The foregoing and other objects of the present invention are achieved with a music analysis system which enables the user to listen to a synthesized version of a musical performance in synchronization with an original recording of the same musical performance. The system further provides facilities for modifying, storing and replaying of the synthesized performance with or without synchronization to the originally recorded performance.

According to one embodiment of the present invention, a first storage medium is provided for storing. Preferably in digital format, an audio signal representing a musical performance having a plurality of instrumental parts. The storage medium further contains a timing code, encoded to the audio signal for synchronization purposes, and beat markers used to specify the rhythmic beats in the musical performance represented by the audio signal. In addition to the recorded performance and synchronization codes, the storage medium contains a synthesized version of the same musical performance wherein the parameters of each instrumental part are represented digitally and stored separately.

A second storage medium containing a variety of instrumental sounds which have been digitally sampled thereon is used in conjunction with the synthesized instrumental parts of the first storage medium to recreate the complete synthesized performance.

The music analysis system of the present invention is a digital processor based system including a digital processor, various types of memory, a proprietary operating system and software, sound generation circuitry, a control console for accepting and displaying user information, and a variety of input/output interfaces for communicating with peripherals including those for the first and second storage mediums.

The method of studying and analyzing music facilitated by the music analysis system enables a student to comparatively listen to an originally recorded musical performance and then manipulate an identical synthesized performance of the same musical composition (or score) to gain a better understanding of the compositional, arranging and conducting or performing techniques contained therein. The method of studying and analyzing a musical performance may include any one or more of the following steps: playing the synthesized performance with or without synchronization to the original performance; listening to only a selected segment of either the synthesized or original performance; listening to the synthesized performance with one or more instrumental parts muted; changing the tempo of the synthesized performance; reassigning various instrumental sounds to the original instrumental parts of the synthesized performance; and storing any modifications to the synthesized performance for subsequent replay, with or without synchronization to the original performance.

Accordingly, the music analysis system of the present invention, provides a music student or teacher with a means which enables an understanding of an original musical performance through analysis, modification, and augmentation of a synthesized version of the same performance.

The invention will be more fully understood from the detailed description set forth below, which should be read in conjunction with the accompanying drawings. The invention is defined in the claims appended at the end of the detailed description, which is offered by way of example only.

DETAILED DESCRIPTION OF THE INVENTION

The present invention provides a music analysis system which enables the user to listen to a synthesized version of a musical performance in synchronization with an original recording of the same musical performance. The system provides means for modification, storing and replaying of the synthesized performance by the user.

Figure 5:
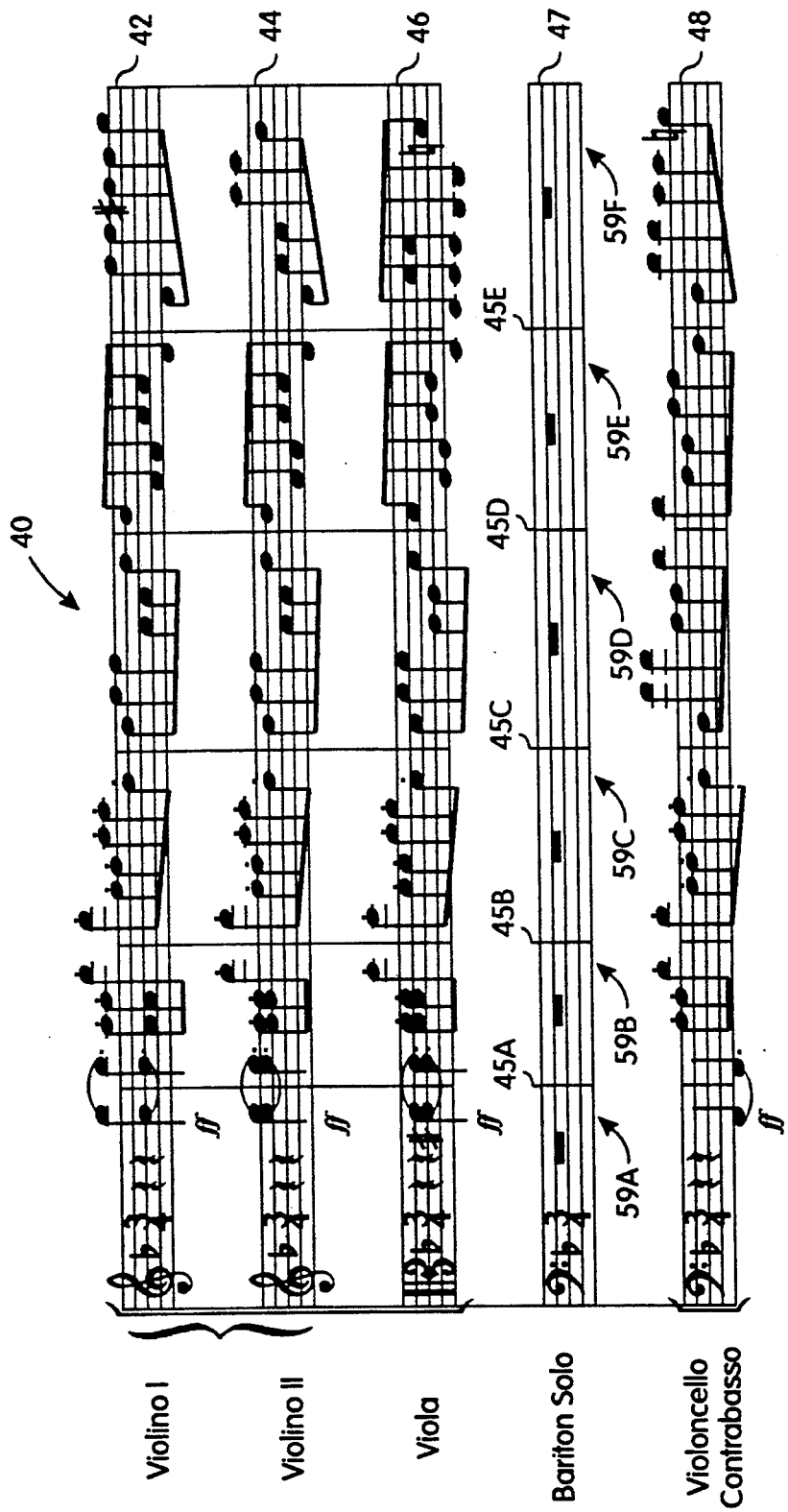
FIG. 5 is an excerpt of an illustrative orchestral score.

Referring to FIG. 5, a segment of a musical score 40 is shown. Musical score 40 is comprised of a plurality of musical staves 42-48. Each stave contains the traditional musical notation for an individual instrumental part. For example, stave 42 contains an instrumental part which is scored for a violin. Stave 46 contains an instrumental part which is scored for a viola. Each instrument part is comprised of a sequence of notations for musical notes having distinct pitches and time values. Each instrumental part is divided rhythmically into a number of finite time sections known as bars. The bars 59A-59F of score 40 are notated by vertical lines on staves 42-48 at locations 45A-E. Each musical bar contains a number of musical beats (in this case 3), the number being dictated by the numerator of the time signature at the beginning of the stave. When instrumental parts are performed as notated on staves 42-48 respectively, a musical performance results.

Proprietary Storage Medium

Figure 2:
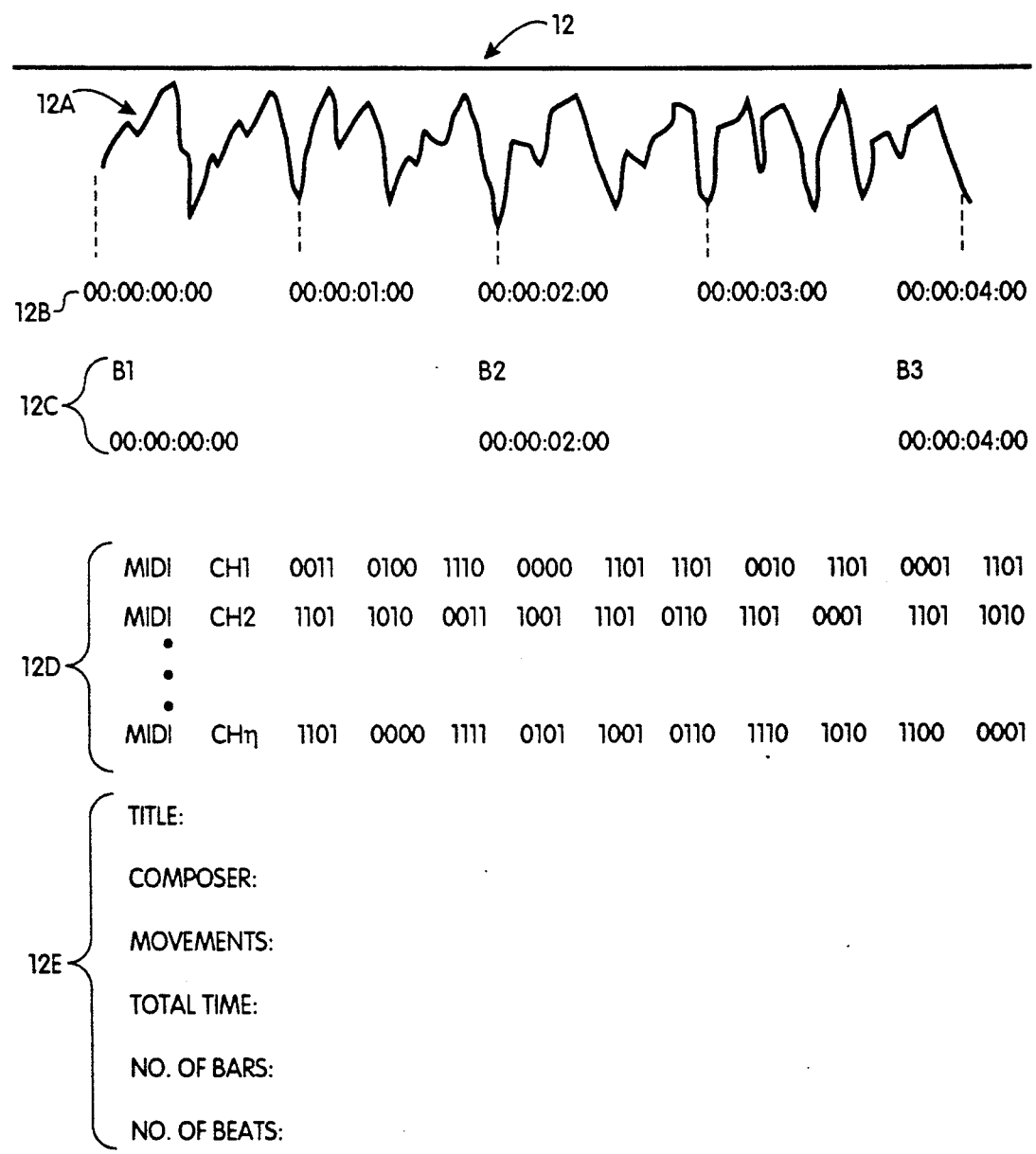
FIG. 2 is a conceptual representation of the proprietary storage medium of the present invention.

Referring to FIG. 2, a storage medium 12, preferably a compact optical disc/ROM (CD ROM), is represented conceptually. For simplification, disc 12 has been divided into a number of tracks 12A-E. Track 12A is symbolically illustrated as containing an analog representation of an audio signal which has been stored on disc 12. Typically, audio track 12A is an analog audio signal recording which has been digitally sampled and stored. Preferably, the recording on audio track 12A represents a musical performance which has multiple instrumental parts and is characterized by a rhythmic sequence of musical beats, score 40 of FIG. 5 being an illustrative score for such a performance.

Track 12B is a conceptual representation of a timing code used to synchronize audio track 12A with other musical data. Preferably, a timing code such as that used by the Society of Motion Picture and Television Engineers (SMPTE), comprises time code track 12B. The SMPTE time code is well understood by those skilled in the recording arts and will not be described in detail here. Basically, a SMPTE time code is a series of addresses that correspond to each 1/30 of a second time interval of a track, from the beginning to the end of the track. A SMPTE time code address has an eight digit format in the form of HH:MM:SS:FF, signifying hours, minutes, seconds and frames where each second contains 30 frame. For example, the first sonic event at the onset of audio track 12A will have the SMPTE code address of 00:00:00:00, signifying zero hours, zero minutes, zero seconds, and zero frames.

To facilitate synchronization of other musical data to audio track 12A, a beat track 12C is added to precisely mark the occurrence of each rhythmic beat of audio track 12A in relationship to time code track 12B. Preferably, beat track 12C is a list or subset of the SMPTE time code addresses of track 12B with each address corresponding to a beat in the musical performance of audio track 12A. Beat track 12C further includes bar and beat markers in the form of sequential reference numbers corresponding to the sequence of SMPTE time code addresses contained therein.

Audio track 12A, preferably containing a musical performance, time code track 12B, preferably a SMPTE code, and beat track 12C, collectively represent the original musical performance.

Track or tracks 12D, which may contain one or more tracks, represents a synthesized version of the original musical performance. Track(s) 12D contains, in a standardized digital format, the data necessary to reconstruct each of the individual instrumental parts shown in score 40 of FIG. 5. The digital format used to store the instrumental parts is preferably the Musical Instrument Digital Interface protocol which is an industry standard protocol, comprised of hardware and software, which enables interfacing of devices made by different vendors.

The Musical Instrument Digital Interface (MIDI) protocol defines a number of standardized digital formats for representing sonic parameters such as pitch (frequency), volume (amplitude), timbre (harmonic content), rhythm (duration), and envelope (volume/time relationship) of a sound or musical note. The MIDI protocol further defines standards for storing and representing polyphonic (more than one) sequences of sounds in the form of conventional noted musical scores such as that shown in FIG. 5.

Basically, the MIDI protocol comprises a combination of dedicated circuitry and accompanying software, which allows a sound which has been generated or recorded by one MIDI device to be accessed by or played on another MIDI device utilizing the same MIDI protocol. The MIDI protocol enables a user to enter, in real time at a MIDI keyboard, all pitch and rhythmic information necessary to generate a MIDI score of an instrumental part. Supplemental parameters of the score such as tempo changes, performance dynamics, and harmonic content of the individual instrumental part are entered later. In this manner, the MIDI protocol enables storing of data representing a complete musical score, including all data necessary to regenerate the musical performance on another device, except for the instrumental sounds which are stored separately and are assignable by the user.

The MIDI protocol is widely known and well within the scope of knowledge of one reasonably skilled in the musical recording arts. Accordingly, a more detailed description of the MIDI protocol is beyond the scope of this document.

Track(s) 12D, shown conceptually in FIG. 2, contains individual MIDI channels for the instrumental parts of staves 42–48 of score 40, respectively. Typically, each channel would be stored on a separate track. Each MIDI channel contains all of the musical data necessary to recreate one instrumental part, except for the actual instrumental sound data. Upon playback, MIDI channels trigger instrumental sounds which have been sampled digitally and stored in a separate ROM memory. Consequently, track(s) 12D contains the MIDI channels which comprise the synthesized version of the original musical performance stored in audio track 12A.

Figure 1:
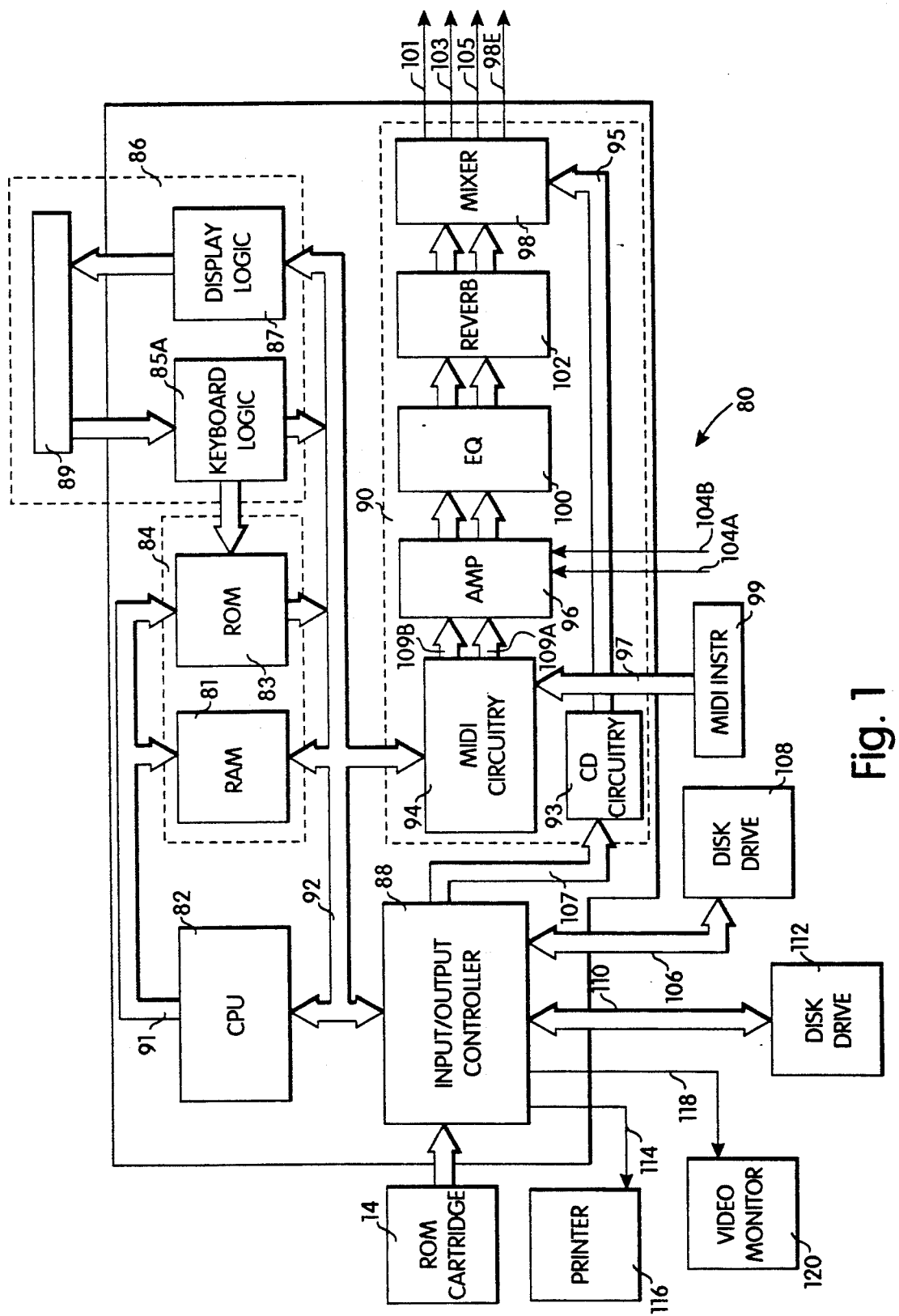
FIG. 1 is a block diagram of the music analysis system of the present invention including peripheral devices used in conjunction with the system.

Track or tracks 12E contain information to be displayed to the user on music analysis system 80 (FIG. 1). Such information typically includes the disc number, title and number of the musical performance stored on the disc, the composer's name, napes and numbers of any movements in the musical performance, the total time of the performance, the number of rhythmic bars in each movement of the musical performance, a listing of the instrumental parts designated in the score and the number of the MIDI channels on which the corresponding instrumental parts of the synthesized performance are stored.

Accordingly, disc 12 contains audio track 12A, preferably containing a musical performance such as that represented in score 40, time code track 12B, preferably a SMPTE code, and beat track 12C, comprising a listing of SMPTE addresses of track 12B at which rhythmic beats occur in audio track 12A. Tracks 12A–C collectively represent the audio and timing data of the original musical performance. Additionally, track(s) 12D contain a complete MIDI representation of the musical performance contained in track 12A whereby one MIDI channel has been allocated for each instrumental part of the musical score. Track 12E contains user information for accessing and identifying the data in tracks 12A–D. Thus, disc 12 contains an original musical performance, a synthesized MIDI version of the same musical performance, and timing and synchronization data necessary for playing the synthesized MIDI performance in synchronization with the original musical performance.

Method of Creating and Storing Proprietary Information

Figure 3:
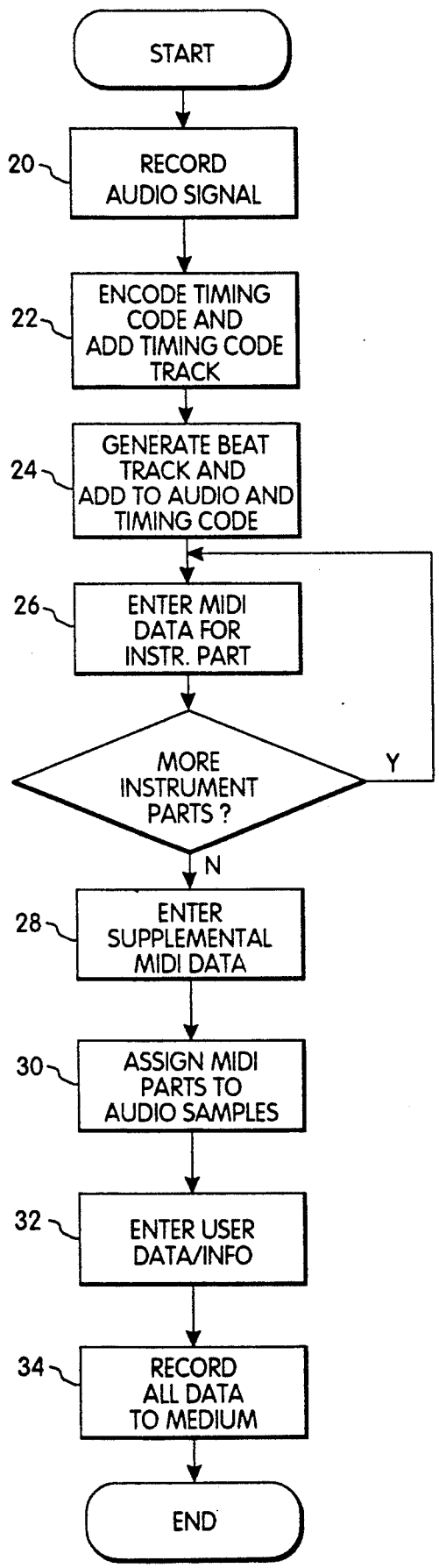
FIG. 3 is a flow chart illustrating the method steps used to create the storage medium of FIG. 2.

FIG. 3 illustrates the method steps used to generate the information stored on disk 12. Typically, the information on tracks 12A–E is entered one track at a time on a series of working magnetic tapes, the final version of which is recorded onto disk 12 as described hereinafter. As indicated by step 20 of FIG. 3, the first step of fabricating disk 12 is to record an audio signal, preferably in digital format, on a magnetic tape. Preferably, the recorded audio signal is representative of a musical performance having a plurality of instrumental parts. The audio signal may have originally been a digital recording or a previously recorded analog signal which has been digitally sampled.

Next, as indicated by step 22, a timing code, preferably a SMPTE code, is encoded with audio track 12A. Typically, audio track 12A will be re-recorded onto a second magnetic tape while a commercially available SMPTE time code generator, synched to the tape recording device, generates SMPTE time code data. A SMPTE time code generator suitably for use in the present invention is commercially available under the tradename BTX Cypher from Cipher Digital Inc., P.O. Box 170, Frederick, Md. 21701. The resulting working tape then contains audio track 12A and time code track 12B, comprised of sequential SMPTE addresses corresponding to every 1/30 of a second interval of audio track 12A.

Next, as indicated by step 24, beat track 12C is generated from audio track 12A and time code track 12B. Typically, beat track 12C is created using a commercially available software package and a personal computer which monitors time code track 12B in real time and, at a manually specified instant, numbers and records the corresponding SMPTE time code address of track 12B. A software package suitable for use in the present invention is commercially available under the tradename Professional Performer Version 2.41 from Mark of the Unicorn, Inc., Cambridge, Mass. 02142. Preferably, a user will listen to audio track 12A and, using a mouse, keyboard or other manual input device of the computer, physically tap the rhythmic beats of audio track 12A into the computer. The resulting beat track 12C, containing sequentially numbered beat markers and corresponding SMPTE addresses, is then recorded onto another track of the working tape along with audio tracks 12A and time code track 12B.

Next, the MIDI data of the synthesized performance is generated, as notated by steps 26-30. Using a personal computer running a commercially available MIDI software package, such as "Professional performer" by Mark of the Unicorn, Inc., Cambridge, Mass. 02142, and a keyboard or other MIDI device coupled with the computer, an instrumental part is accurately performed from a copy of the musical score. For example, instrumental part 52 of score 40 will be played in real time at the MIDI keyboard to generate a "channel" of MIDI data representing the pitch and rhythmic information of instrumental part 52. The MIDI software in most cases, enables the instrumental part to be played in real time at a tempo which is lower than that designated on the score, thereby ensuring an accurate performance. This step, represented by step 26, is repeated for instrumental parts 54-58, thereby generating a part by part MIDI representation of score 40 in which each instrumental part is stored on a separate MIDI channel in the computer memory.

After the pitch and rhythmic information of each instrumental part has been entered into a separate MIDI channel, additional MIDI information is added using the computer keyboard. As designated by step 28 of FIG. 3, interpretative parameters, such as dynamic changes, instrumental tone, and tempo variations, are added to each MIDI channel using the editing facilities of the MIDI software and computer.

Next, as designated by step 30, each MIDI channel representing an instrumental part is assigned to a synthesized "voice" or sampled sound which the MIDI channel will trigger to simulate the sound of the instrument of the originally recorded performance.

The Professional Performer software, or an analogous MIDI software package, further numbers each bar and beat of score 40 as well as storing data for each MIDI channel which can be used to create a visual copy of the score such as that shown in FIG. 5.

The resulting MIDI track or tracks 12D, containing a complete MIDI representation of score 40, including separate MIDI channels for each instrumental part, is stored in the computer memory.

In an alternate, although more cumbersome, method, all MIDI data contained in track(s) 12D, including the pitch and rhythmic information of each MIDI channel, may be entered visually at a computer keyboard via the MIDI software package. This method is preferable for those musicians who are unaccustomed to playing keyboard instruments.

Next, as indicated by step 32, user information relating to the data on tracks 12A-D is entered through the computer and stored in memory. The user information includes the disc number, the title number of the piece, the title of the piece, the composer, names and numbers of the movements of the piece, total time of the piece, number of the bars for each movement, etc. This data is recopied onto yet another track of the working tape as track(s) 12E along with track(s) 12D and tracks 12A-C.

Finally, once all of the information contained on tracks 12A-E is entered onto a working tape, this information is written onto disc 12 using a conventional compact disc writing technique, as indicated by step 34. For simplification, the tracks 12A-E of disc 12 have been partitioned conceptually according to the type of data represented therein. It would be obvious to one reasonably skilled in the art that the actual distribution of data to disc tracks may vary with applications and is a matter of design choice, as is the medium in which this data will be recorded. Typically, to facilitate real time alignment of audio track 12A with MIDI track(s) 12D, time code track 12B and beat track 12C will be interpolated with audio track 12A into a single track in the final format of disc 12.

ROM cartridge 14, shown in FIG. 1, contains a plurality of instrumental sounds or audio samples which have been stored digitally. The audio samples are typically created by playing an acoustic instrument into a device which digitally samples the tone of the instrument and stores the sampled data in a computer memory. This sample tone forms a model of the instrumental sound which is triggered by the data in a MIDI channel. Each MIDI channel contained in track 12D of disk 12 is assigned to one audio sample in ROM cartridge 14. When indicated by the data in a MIDI channel in track 12D, an audio sample from cartridge 14 is converted by the MIDI protocol and circuitry in system 80, which includes digital to-analog converters, into an audio tone which simulates the designated acoustic instrument named in the corresponding instrumental part of score 40. The audio samples may be stored digitally in ROM cartridge 14 or any device which allows storage and MIDI access of digital audio samples, including magnetic and optical disks of varying sizes. A ROM cartridge suitable for use with the present invention is commercially available from Kurzweil Music Systems, Inc., 411 Waverly Oaks Road, Waltham, Mass. 02154-6484.

The Music Analysis System

Referring to FIG. 1, a block diagram is shown of music analysis system 80. System 80 is, preferably, a microprocessor based system comprising special function, integrated circuit (IC) chips and special MIDI circuitry.

Music analysis system 80 can be conceptionally divided into the central processor unit 82, memory subsystem 84, user interface subsystem 86, peripheral input/output controller 88, signal processing subsystem 90, and a plurality of buses and signal paths interconnecting these subsystems.

In the preferred embodiment, central processing unit (CPU) 82 is comprised of a commercially available microprocessor, such as the Model 80286 16-bit microprocessor, produced by Intel Corporation, Santa Clara, Calif. 95051. CPU 82 further comprises any supporting IC chips necessary to help the microprocessor interface with the other elements of system 80. Such additional support chips include, but are not limited to, a clock generator IC, a bus controller IC, and interrupt controller IC and various transceiver and latch IC's. These additional support chips are also available from Intel Corporation, and are specifically compatible with the Model 80286 microprocessor. CPU 82 is connected to memory subsystem 84 by a 24-bit address bus 91 and a 16-bit data bus 92.

Memory subsystem 84 is comprised of random access memory (RAM) 81 and read only memory (ROM) 83. Address bus 91 supplies addresses from CPU 82 to RAM 81 and ROM 83, while data accessed at these addresses is supplied to CPU 82 and the other elements of system 80 over data bus 92. In the preferred embodiment, RAM 81 is comprised of a plurality of commercially available RAM IC chips, the size and configuration being left to the designer's discretion. RAM 81 further includes any additional non-memory circuitry, such as a memory controller IC, necessary for implementing and interacting RAM 81 with the other elements of system 80. Likewise, ROM 82 is comprised of a plurality of commercially available ROM IC chips, the size and arrangement being left to the designer's discretion. ROM 82, similarly, includes any non-memory circuitry such as a memory controller IC and bus interface registers necessary for successfully interfacing ROM 83 with the other elements of system 80.

Figure 4:
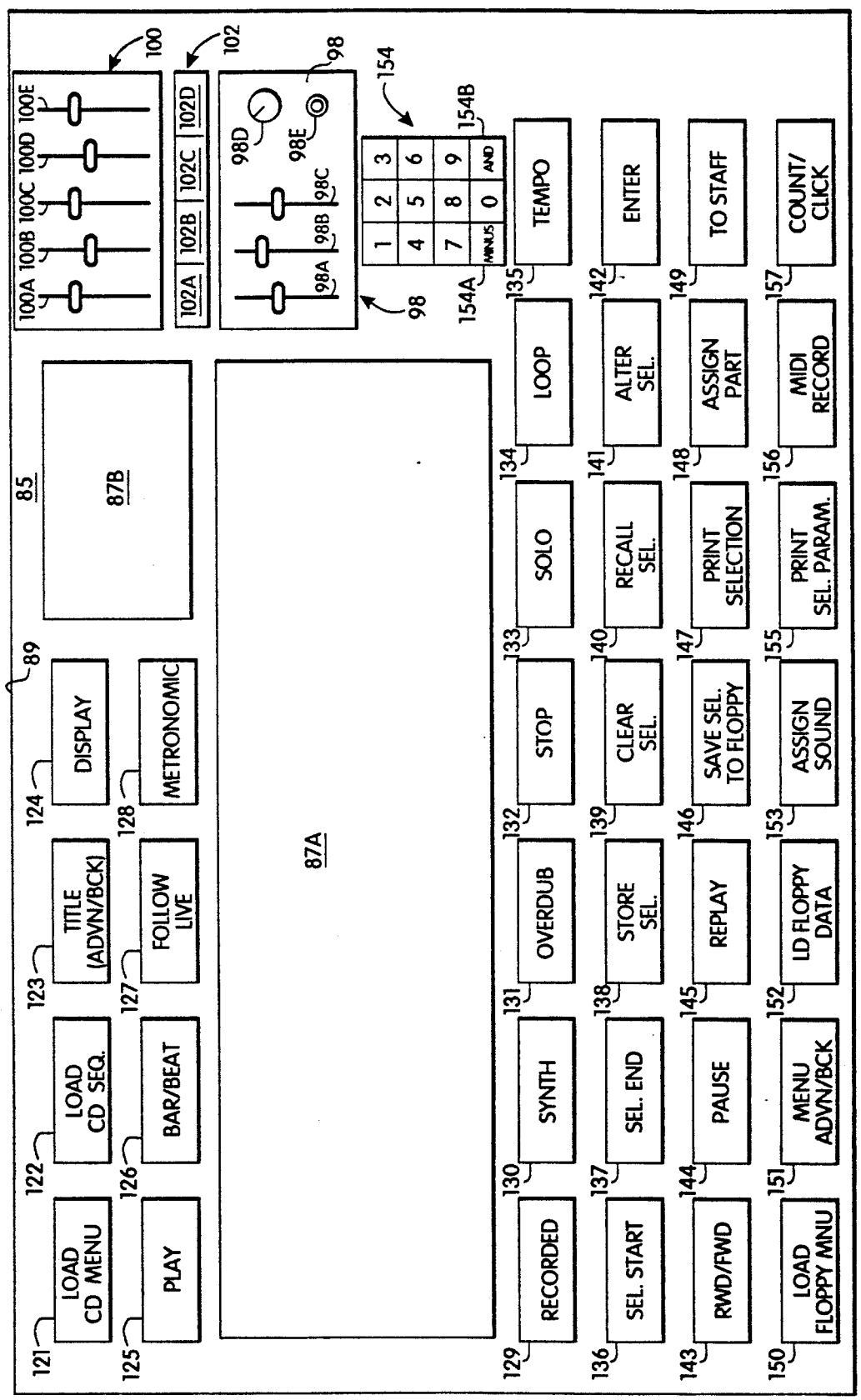
FIG. 4 is an illustration of a control panel for the system of FIG. 1.

User interface subsystem 86 is comprised of a keyboard interface logic 85A and display logic 87. In the preferred embodiment, keyboard 85 (FIG. 4) is comprised of a plurality of push button and rocker-type switches or keys and the control circuitry required for interfacing the keyboard signals with ROM 83 and CPU 82. Each key of keyboard 85 is used to initiate a function which is executed by the various elements of system 80. FIG. 4 illustrates a typical arrangement of the keys comprising keyboard 85, including a 9-digit numeric keypad 154. In an alternate embodiment, a conventional alpha numeric keyboard may be interfaced with input/output controller 88 and data bus 92 for processing of user commands by CPU 82.

In the preferred embodiment, display logic 87 is comprised of one or more liquid crystal displays, as shown in FIG. 4. The main display 87A is preferably a back-lit LCD display with a 640×320 resolution. The smaller display 87B is also a back-lit LCD display with a 180×80 resolution. Display logic 87 further includes the necessary timing and drive circuitry necessary to generate the display and interface the display with data bus 92, including display buffer memory. It is obvious to one reasonably skilled in the art that main display 87A may be further divided into a plurality of smaller LCD displays or the display apparatus itself ma be implemented with a different technology such as an electroluminescent screen or a CRT video display monitor. As shown in FIGS. 1 and 4, user interface subsystem 86 further comprises control panel 89, on which keyboard 85 and displays 87A-B are located, as well as a variety of manual input controls to signal processing subsystem 90.

Signal processor subsystem 90 is comprised of CD circuitry 93, MIDI circuitry 94, amplifier 96, mixer 98, equalizer 100, and reverberation unit 102. MIDI circuitry 94 is comprised of dedicated circuitry, including digital-to-analog converters, necessary to convert the MIDI data supplied over bus 92 into analog signals. The exact requirements of MIDI circuitry 94 are defined by the MIDI protocol and are within the knowledge of one reasonably skilled in the field of electronic music circuits. Accordingly, a detailed description of the MIDI circuitry is beyond the scope of this document. MIDI circuitry 94 contains a quantity of ROM memory, similar to ROM 83, which contains a copy of commercially available MIDI software, such as "Professional Performer" by Mark of the Unicorn, Inc. MIDI bus 97 provides a means for connecting MIDI instrument 99, preferably a keyboard or other instrument with a MIDI interface, to MIDI circuitry 94. The MIDI software stored in MIDI circuitry 94 formats the MIDI data entered via instrument 99 and bus 97, according to the MIDI protocol and sends it to RAM 81 for storage with an existing MIDI score as explained hereinafter.

MIDI circuitry 94 further includes synchronization circuitry capable of synchronizing the MIDI and SMPTE data read from disc. Such MIDI to SMPTE synchronizing circuitry is available commercially in a device known as the "Jam Box" from South Worth Music Systems, Inc., 91 Ann Lee Road, Harvard, Mass. 01451.

In an alternate embodiment, MIDI circuitry 94 may include SMPTE to SMPTE synchronizing circuitry or MIDI to MIDI synchronizing circuitry in addition to or in place of the existing MIDI to SMPTE synchronizing circuitry.

MIDI circuitry 94 further includes a commercially available National Television Standards Committee (NTSC) signal generating circuit for converting MIDI data into a complete video signal capable of driving a video display device. Such a circuit enables the MIDI data to be viewed visually in the form of a musical score as shown in FIG. 5. MIDI circuitry 94 interfaces with ROM cartridge 14 containing the audio samples via I/O controller 88 and data bus 92.

The audio signals generated by MIDI circuitry 94, representing the synthesized performance or unsoloed, and any soloed instruments, as explained hereinafter, are transmitted to amplifier 96 over audio bus 109A and 109B, respectively.

The audio signals carried by buses 109A-B are processed by amplifier 96, equalizer 100, reverberation unit 102 and coupled with their respective stereo audio bus in mixer/amplifier 98. Amplifier 96 preferably is comprised of a plurality of internal IC preamplifiers. Amplifier 96 further contains a line level input 104A and a conventional cannon jack input 104B for accepting a line level or microphone level signal, respectively. These inputs allow external signals to be amplified for subsequent modification and mixing by signal processor subsystem 90. The audio signals amplified by amplifier are then sent to equalizer 100.

Equalizer 100, in the preferred embodiment, is a 5-band graphic equalizer, with the center frequencies of the bands occurring at 60 Hz, 200 Hz, 600 Hz, 2 KHz and 10 KHz, for example. Preferably the level of gain or attenuation of each band is at least $+/-10$ dB. It is obvious to one reasonably skilled in the art that the number of bands of the equalizer, the center frequencies of the bands and the level of gain or attenuation of each band is left to the designer's discretion. The gain or attenuation levels of each band of equalizer 100 are controlled by a number of conventional sliding potentiometers 100A-E, as shown in the control panel 89 of FIG. 4. After the audio signals generated by MIDI circuitry 94 are amplified by amplifier 96 and modified by equalizer 100, they are processed by reverberation unit 102 which is connected to equalizer 100.

Reverberation unit 102 is preferably a digital processor based unit having a plurality of pre programmed settings for simulating the ambient acoustics of varying sized interiors. Typically, these settings would be programmed for no reverberation, i.e, a "dry" signal, or to simulate rooms or halls having increasing amounts of reverberation, i.e, a "wet" signal. A plurality of push button switches 102A-D electrically coupled to reverberation unit 102, enables the user to select the desired amount of reverberation from control panel 89.

Compact Disc (CD) circuitry 93 contains conventional, circuitry, such as digital to analog converter, and amplifiers, for conversion of the data representing the recorded performance into an analog audio signal. Such circuitry is within the knowledge of one reasonably skilled in the field of audio electronics and will not be described in detail in this document. The digital data representing the recorded performance stored on disc 12 of optical disc player 108 is supplied to CD circuitry 93 via bus 106, and input/output controller 88, and bus 107 as shown in FIG. 1.

After reverberation unit 102, the audio signals from the synthesized performance, both soloed and non soloed, are sent to an internal stereo summing amplifier of mixer/amplifier 98 along with the audio signal of the recorded performance from CD circuit 93 via bus 95. Mixer/amplifier 98 which contains three separate stereo audio buses, for the recorded performance, synthesized performance and soloed instruments, respectively, mixes the audio signal and sends the final mix to signal outputs 101, 103 and 105 and a headphone preamplifier. The gain level of stereo audio buses is controlled by conventional sliding potentiometers 98A-C, as shown on control panel 89 of FIG. 4. Mixer/amplifier 98 drives signal outputs 101, 103 and 105 which may be connected to a tape recorder, an amplifier or loud speakers., respectively In addition, mixer/amplifier 98 includes an internal headphone pre-amplifier level control 98D and a headphone output jack 98E as shown in FIGS. 1 and 4.

Input/output (I/O) controller 88 provides system 80 with an interface to peripherals and storage mediums such as disc 12, I/O controller 88 contains the bus interface circuitry, buffers, interrupt and arbitration circuitry necessary for communicating with external peripherals. Such I/O controller ICs are commercially available and will not be described here in detail. I/O controller 88 communicates with the other elements of system 80 over data bus 92 and address bus 91. I/O controller 88 communicates with optical disc player 108, which is used for reading data from disc 12 over bus 106. I/O controller 88 interfaces with disk drive 112 through bus 110. Preferably, disk drive 112 accommodates a 3 ½ inch floppy disks. I/O controller 88 further comprises an RS-232 printer port 114 provided for transferring serial data, at a pre-selected baud rate, to printer 116. Printer 116 is preferably a laser or dot matrix printer. I/O controller 88 further comprises a video output port 118. The NTSC signal generating circuit within signal processor subsystem 90 supplies video output port 118 with a complete video signal which is capable of driving a conventional video display device 120 such as video monitor or video projector having a digital data interface.

Preferably the components of system 80, including disc drives 108, floppy disk drive 112 and ROM cartridge 14, are housed in a single chassis which contains proper ports for ventilation and electrical connections. In an alternate embodiment, drives 108 and 112 may be connected to a chassis which houses system 80 via bus cable connectors. Likewise, printer 116 and video monitor 120 are connected to the chassis containing system 80 through cables. Control panel 89 may be formed as an integral part of the chassis or, may be connected to the chassis via cabling. As an alternate embodiment, the chassis may contain an integral pair of stereo loud speakers interconnected with signal output 105.

A brief functional description of the elements of system 80 follows. ROM 83 includes MIDI software and a proprietary operating system containing instructions corresponding to each key function of keyboard 85. RAM 81, which preferably has a minimum memory capacity of two megabytes, stores data downloaded via I/O controller 88 from disk drives 108 and 112, and ROM cartridge 14. RAM 81 also stores sequences of on line instructions specified by the user through keyboard 85. A proprietary operating system stored in ROM 83 controls all accessing, playback and other functions of disk drive 108, loading and manipulation of data from disc 12, generation of sounds from audio samples 16 contained in ROM cartridge 14, and generation of output data for the printer port 116 or video output port 118.

Once power is supplied to system 80, the user selects the appropriate key of keyboard 85 to start using system 80. Keyboard 85 is coupled to ROM 83 directly, or via CPU 82 and data bus 92 and address bus 91. A sequence of instructions stored in ROM 83, which collectively perform the function of the designated key, are then supplied to the CPU 82 and various other elements in system 82 to execute the desired key function. For example, depression of a LOAD CD MENU key causes an execution by CPU 82 and I/O controller 88 of the instructions for loading the user information from disc 12 into RAM 81. Likewise, similar keys cause the instructions stored in ROM 83 to, in conjunction with CPU 82, control the function of the other elements within system 80. The physical steps involved in the execution of other similar functions as specified by keyboard 85 are similar to that described, and is within the knowledge of one reasonably skilled in the art and will therefore, not be described.

System Functionality

The following is a brief description of preferred system functions selectable via keyboard 85 and defined by the instructions contained in ROM 83. The real-time sequence of instructions entered via keyboard 85 collectively form a "selection" whose parameters are displayed on the main display 87A and which may further be stored in RAM 81 and to floppy disk via drive 112 using the appropriate keys.

Referring to FIG. 4, control panel 89 of system 80 is shown, the control panel 89 includes keyboard 85 comprised of keys 121-155, main LCD display 87A and secondary LCD display 87B, and signal processing controls 100A-E, 102A-D, 98A-E. A description of each of the functions facilitated by keys 121-155 follows.

A number of the two-position, push-button, switch type keys on keyboard 85 require numeric values to be entered after engagement of the key. This is accomplished by depressing the desired key followed by a numeric entry on the numeric keypad 154 followed by the ENTER key 142. If more than one numeric entry is specified, these entries must be followed by the AND key 154B, which enters each numeric value and instructs the system to wait for the next entry. For example, if the user desires to listen to only instrumental parts 2 and 4, the user would engage the SOLO key 133, followed by the 2 key on keypad 154, followed by the AND key 154B, followed by the 4 key of keypad 154, followed by the ENTER key 142. A MINUS key 154A is further provided to eliminate incorrectly entered numeric values when entered. For example, entering the numeral 2 on keypad 154 followed by the MINUS key 154A followed by the numeral 2 again will erase the entry for the numeric value of 2. The MINUS key may further be used to selectively eliminate instrumental parts from playback. For example, by engaging the SOLO key 133 followed by the MINUS key 154A, followed by a numeric entry from keypad 154 and the ENTER key 142, the user is able to hear all instrumental parts of the synthesized performance except for the instrumental part corresponding to the numeric value eliminated with the MINUS key. The function keys of system 80 are explained hereinafter.

In the preferred embodiment, every key that requires user entered numbers before activation has a green light emitting diode (LED) that begins flashing when the key is engaged and continue flashing until a numeric value has been entered on keypad 132 followed by the ENTER key 142. Preferably, the user may clear incorrect numeric entries by disengaging and then re-engaging the key. Preferably, each function key has a red LED which flashes when the key is engaged until the PLAY key 125 is depressed at which point the LED remains on continuously. The exact manner in which the LED's are controlled to flash and light is known in the art and does not form part of the present invention.

A number of keys in keyboard 85 allow the user to select information from disc 12 and load the selected information into RAM 81. The LOAD CD MENU key 121 initiates a down loading of the user information contained on track 12E of disk 12 into RAM 81. The LOAD CD SEQ. key 122 initiates a down loading of the data from band or tracks 12D of disk 12 into RAM 81. The TITLE (ADVANCE/BACK) key 123 enables a user to select a composition from the CD menu prior to loading the data into memory. Typically, after powering the system, the user depresses the LOAD CD MENU key 121 to load the CD menu and then, using the TITLE ADVANCE/BACK key 123, selects the desired data from the CD menu. Having now selected a performance, the user then depresses the LOAD CD SEQ. key 122 to load the MIDI data for the selected performance into RAM 81.

A number of keys in keyboard 85 are provided to allow the user to play the synthesized performance in synchronization with the original performance or change the playback tempo of the synthesized performance. Engaging the PLAY key 125 initiates playback of both the originally recorded performance contained on tracks 12A-C of disc 12 and the synthesized performance contained in RAM 81. Both the original and synthesized performance are played in synchronization, however, the user selects which performance he wishes to hear, as outlined hereinafter. Selecting the METRONOMIC key 128 disengages the synchronization of the recorded performance to the synthesized performance and causes the synthesized performance to follow the tempo data of the MIDI score, which in turn may be derived from the composer's own tempo designations. Selecting the TEMPO key 135, engageable only if the METRONOMIC key 128 has been depressed, changes the tempo of the synthesized performance from that designated by the MIDI data to that indicated by the user. Selecting the FOLLOW LIVE key 127 again engages the synchronization of the recorded performance to the synthesized performance, similarly to PLAY key 125. By using the METRONOMIC key 128 and TEMPO key 135, the user is able to unsynchronize the synthesized performance from the recorded performance and hear the synthesized performance played at a tempo specified in the MIDI score or by the user. In this manner, the user may play the synthesized performance in synchronization with the real performance or may specify a different tempo for the synthesized performance when not synchronized to the recorded performance.

A number of other keys in keyboard 85 allow the user to selectively listen to various parts of both the synthesized performance and the recorded performance. Engaging the RECORDED key 129 causes a muting of the audio buses carrying the synthesized performance, allowing only the originally recorded performance to reach the headphone outputs 101 and the audio outputs 103 and 105. Conversely, selecting the SYNTH key 130 mutes the audio buses carrying the recorded performance, allowing only the complete synthesized performance to reach the headphone outputs 101 and the audio outputs 103 and 105. Selecting the OVERDUB key 131 sends both the synthesized performance and the recorded performance to their respective audio buses and onto the headphone output 101 and audio outputs 103 and 105. Selecting SOLO key 133 followed by one or more numeric key-pad entries separated by the AND or MINUS keys, separates the corresponding instrumental parts of the MIDI score in signal processor subsystem 90 and assigns the selected instrumental parts to the SOLO audio bus if the PLAY key 125 is subsequently engaged. All other "non soloed" instrumental parts of the MIDI score remain assigned to the SENT audio bus. The volume of each audio bus is individually controllable via potentiometers 98A-C. Disengaging the SOLO key 133 reassigns any previously "soloed" instrumental part of the synthesized performance to the SYNTH audio bus.

The PLAY, SYNTH and SOLO keys in conjunction with the OVERDUB key 131 provide the user with substantial freedom while listening to the playback of a musical composition. While the composition is playing in real time, the user may selectively listen to the recorded performance, via the PLAY key 125, the complete synthesized performance, via the SYNTH key 130, or selected instruments of the synthesized performance, via the SOLO key 133. The OVERDUB key 131 enables the user to simultaneously hear both the recorded performance and the complete synthesized performance or only those instrumental parts of the synthesized performance selected with the SOLO key 133. The OVERDUB key 131 in conjunction with the SOLO key 133 enables the listener to isolate and highlight selected instrumental parts of the synthesized performance which are individually undiscernable from the-recorded performance, as if the musicians themselves were performing these parts louder than normal. To control the relative volume of the recorded performance, the synthesized performance and the soloed parts of the synthesized performance, individual sliding potentiometers 98A–C are provided for individually controlling the volume of the RECORDED, SYNTH and SOLO audio buses of mixer/amplifier 98, allowing the user broad flexibility as to what he wishes to hear.

A number of keys are further provided for allowing the user to select specific sections of the synthesized performance and the recorded performance. The REWIND/FORWARD key 143 enables a user to scan through both the recorded and synthesized performances while maintaining synchronization therebetween. The bar, beat and time elapsed since the beginning of the piece are displayed in real time on main display 87A, enabling a user to visually find a starting point for listening. The BAR/BEAT key 126 followed by a key pad entry designates a starting point for a subsequent playback of a piece other than the first beat of the piece. The SELECT START key 136 followed by keyboard entries designates the first bar and beat of the selection to be played. Similarly, the SELECT END key 137 followed by key pad entries enables the user to designate the last bar and beat of a selection to be played.

The STORE SELECT key 138 enables the designated beginning and end of a selected section, along with other user-specified parameters including tempo, soloed parts, etc., as explained hereinafter, to be stored in RAM 81 or on disk 111 under a selection number. Conversely, the CLEAR SELECT key 139 followed by a key pad entry deletes the designated selection from RAM 81. The RECALL SELECT key 140 followed by a key pad entry recalls the designated selection from RAM 81 or disk 111. The ALTER SELECT key 141 enables the user to alter the currently playing selection and enter new selection parameters which will replace the old parameters when the STORE SELECTION key 138 is pressed again. The LOOP key 134 when followed by a key pad entry and the PLAY key 125 enables a designated selection to be played repeatedly from beginning to end in a continuous fashion. Selecting the REPLAY key 145 returns playback to the beginning of the last played selection.

The functionality facilitated by these keys enables the user to define specific sections of a composition for current or future listening. For example, using either the BAR/BEAT key 126 or the REWIND/FORWARD key 143, the user may go to a specific point in a composition. Then, using the SELECT START key 136 and SELECT END key 137, he may define a beginning and end of a selection. Using the STORE SELECT key 138 followed by a key pad entry, he may assign a number to this selection and store it in memory. This process may be repeated until the user has defined several selections in memory, with each selection having a specific beginning and end within the composition. The user is then free to recall, clear or alter the selection using the appropriate keys as defined above. Further, the user may recall any one of the selections and play the selection from beginning to end or, using the LOOP key 134, have the selection play continuously from beginning to end in a continuous loop type fashion for repeated listening of a particular selection. Alternately, the user may listen to a selection from beginning to end and then, using the REPLAY key 145, repeat the selection from beginning to end only once.

A number of keys are provided to enable the user to re orchestrate the synthesized performance. The ASSIGN SOUND key 153 and a key pad entry followed by the TO STAFF key 149 and a key pad entry enables the user to assign one of the audio samples 16 contained on ROM cartridge 14 to one of the instrumental parts contained in a MIDI channel in RAM 81. Similarly, just as an audio sample may be assigned to MIDI channels, the channel/audio sample assignment designated in the MIDI score may be over ridden. Engaging the ASSIGN PART key 148 and a key pad entry followed by the TO STAFF key 149 and a key pad entry disconnects the MIDI channel assignment of an audio sample and designates a new MIDI channel which will access the audio sample. In this manner an instrumental part may be reassigned to a different audio sample. For example, the MIDI channel containing the melody line of an orchestral score, which was originally assigned to a trumpet sound may, using the above keys, be reassigned to a violin sound. In this manner, the user may completely change the instrumental part/audio sample assignments and thereby re-orchestrate the synthesized performance as desired.

A number of function keys are provided on keyboard 85 for allowing the user to enter additional MIDI parts to the synthesized performance for storage, recall and manipulation identical to the MIDI score contained on disc 12. The MIDI RECORD key 156 followed by the PLAY key 125 allows the user to enter an additional MIDI part, via MIDI bus 97, by physically performing the instrumental part on a MIDI keyboard or other MIDI instrument 99, at the current playback tempo of the synthesized performance. The MIDI RECORD key 156 and a keypad entry followed by the ENTER key 142, allows the user to specify the MIDI track in RAM 81 on which the new MIDI data will be entered. If the track number corresponds to an existing track in RAM 81, the existing track will be deleted and replaced with the new MIDI data. If the keypad entry corresponds to a MIDI track non existent in RAM 81, a new MIDI track will be started provided adequate memory is present in RAM 81. In this manner, the MIDI RECORD key 156 enables a user to delete and re write instrumental parts of the synthesized performance or augment the performance by adding new MIDI parts. Any new MIDI parts may then be stored, played, printed, modified and edited as part of a selection along with the rest of the MIDI score in RAM 81.

To further assist the user in entering or re-writing instrumental parts of the synthesized performance, a COUNT/CLICK key 157 is provided to enable the user to hear one measure of audible clicks to "count-off" the rhythm before the actual playback of either the recorded or synthesized performance. By engaging the COUNT/CLICK key 157, followed by either the RECORD key 129 or the SYNTH key 130, a measure of audible clicks is sent to the audio outputs at a rate determined by the current tempo of the selection. The normal playback of the performance then begins after the measure of audible clicks. In this manner, the musician is able to anticipate the beat of the performance before normal playback begins.

A PRINT SELECTION key 147 enables a user, after having defined and stored a selection in RAM 81, to have a selection printed as a hard copy traditional musical score, such as that shown in FIG. 5. For example, the user would select the PRINT SELECTION key 147 followed by a key pad entry designating the selection to be printed. The staves and portions of the composition as defined in the selection are then printed via printer port 116 on a dot matrix or laser type printer having a serial data interface.

A number-of function keys are provided on key board 85 for controlling the disk player 112, which preferably contains a floppy diskette. The SAVE SELECT TO FLOPPY key 146 transfers all selection data in RAM 81 to the diskette. The LOAD FLOPPY MENU key 150 reads the menu from the diskette and stores it in RAM 81 as well as displaying it on small LCD display 87B. The MENU ADVANCE/BACK key 151 enables scrolling of the floppy diskette menu to facilitate locating the proper data file stored on the diskette. The LOAD FLOPPY DATA key 152 reads the data in the top entry of the diskette menu and stores this data in RAM 81. The data which is storable on diskette may comprise user defined selections, complete synthesized performances, or audio samples. The above keys enable storing, access and recalling of such data.

The parameters relating to the current selection are displayed on main LCD display 87A, normally. The DISPLAY key 124, in conjunction with the RECALL SEL key 140, enables the user to display the parameters of all selections stored in RAM 81 on main LCD display 87A, without having to recall each selection individually. If the user engages the RECALL SEL key 140 followed by two depressions of the DISPLAY key 124, the parameters of all selections will be displayed on main LCD display 87A.

A PRINT SEL PARAM key 155 enables a user to print a hard copy of the numerical parameters of all selections currently contained in RAM 81 or stored on floppy diskette. In this manner, the user may examine the numerical data relating to the parameters of all currently stored selections without having to individually recall each selection from diskette.

A number of other miscellaneous keys are provided to facilitate the use of the music analysis system 80 such keys include the STOP key 132, the PAUSE key 144, etc., the functions of these keys being within the skill of one reasonably skilled in the art.

Method of Musical Analysis

In light of the above discussion, it is apparent that the keys of keyboard 85 may be combined in many different sequential orders, thereby enabling the music analysis system 80 to perform a variety of functions useful in the study of music composition, arranging performance and conducting.

Figure 6A:
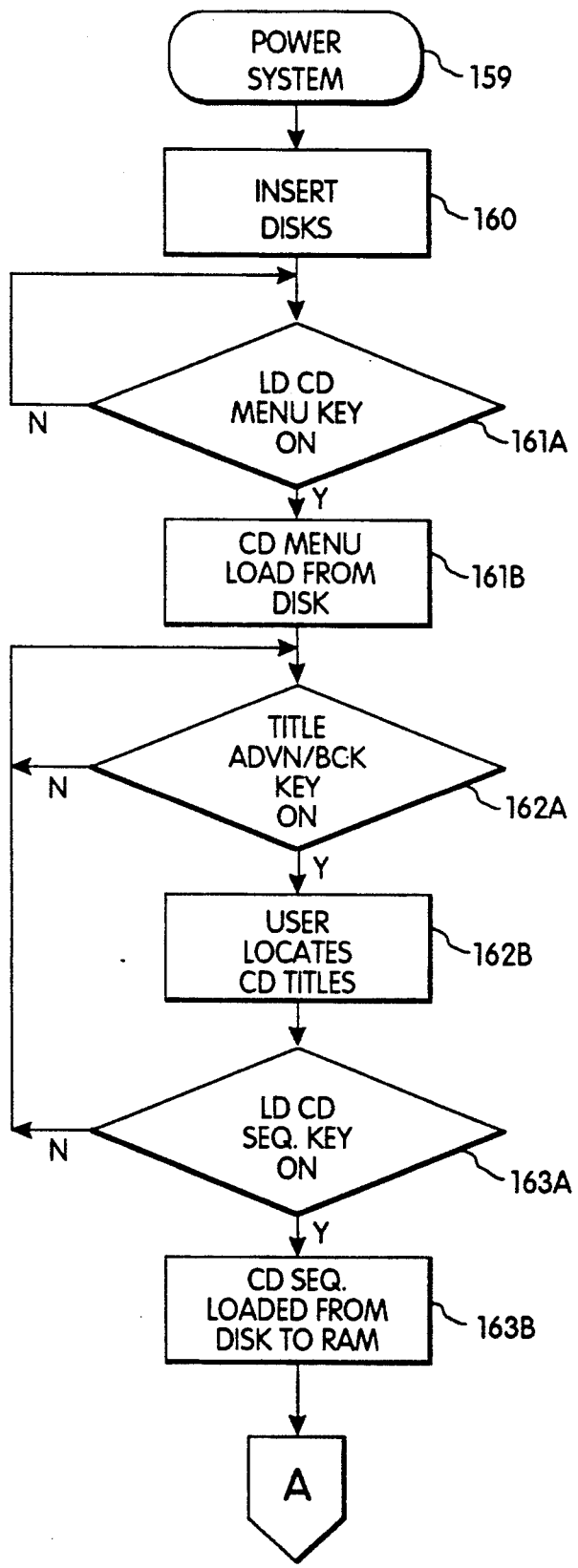
FIGS. 6A-E are flow charts indicating a possible sequences of instructional commands for the system of FIG. 1 to facilitate the method of studying and analyzing music of the present invention.

The following is a description of some illustrative functions available from music analysis system 80, the steps of each function notated according to their accompanying key functions in FIGS. 6A–E. Referring to FIG. 6A, after having supplied power to the system as notated by step 159, the user inserts disc 12 into disc player 108 as noted by step 160. Next, the user engages the LOAD CD MENU key 121 to load the CD menu from disc 12, as notated by steps 161. The user then utilizes the Title ADVANCE/BACK key 123 to locate the desired performance in the CD menu, as indicated by steps 162A and 162B. Once the user has selected the desired title as displayed on main LCD display 87A, he engages the LOAD CD SEQ key 122 to load the MIDI data comprising the synthesized performance into RAM 81, as indicated by steps 163. Having now loaded and selected a particular musical performance, there are a plurality of operational sequences which the user may select. These possibilities are outlined on FIGS. 6B–E.

Figure 6B:
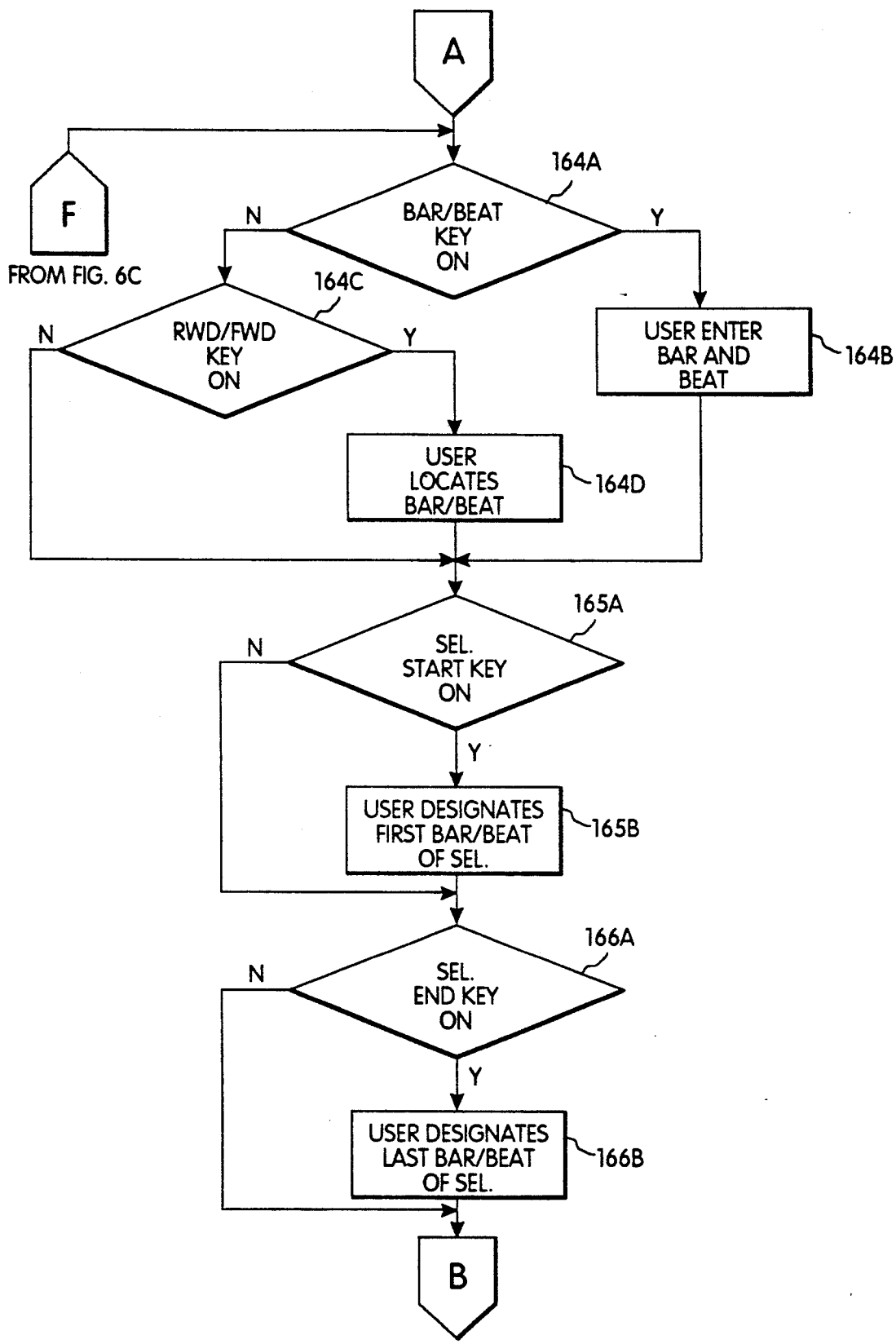
Figure 6C:
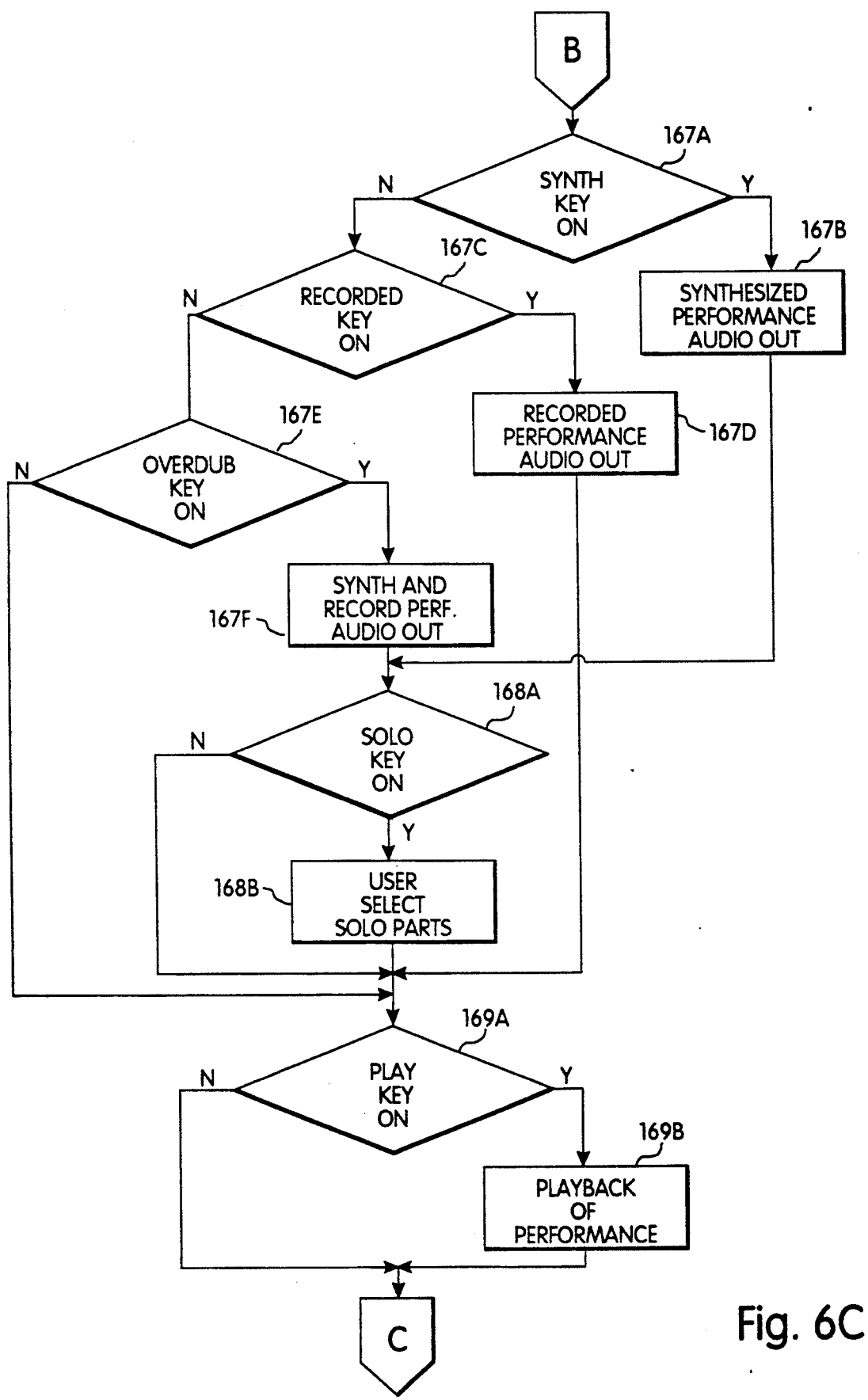
Figure 6D:
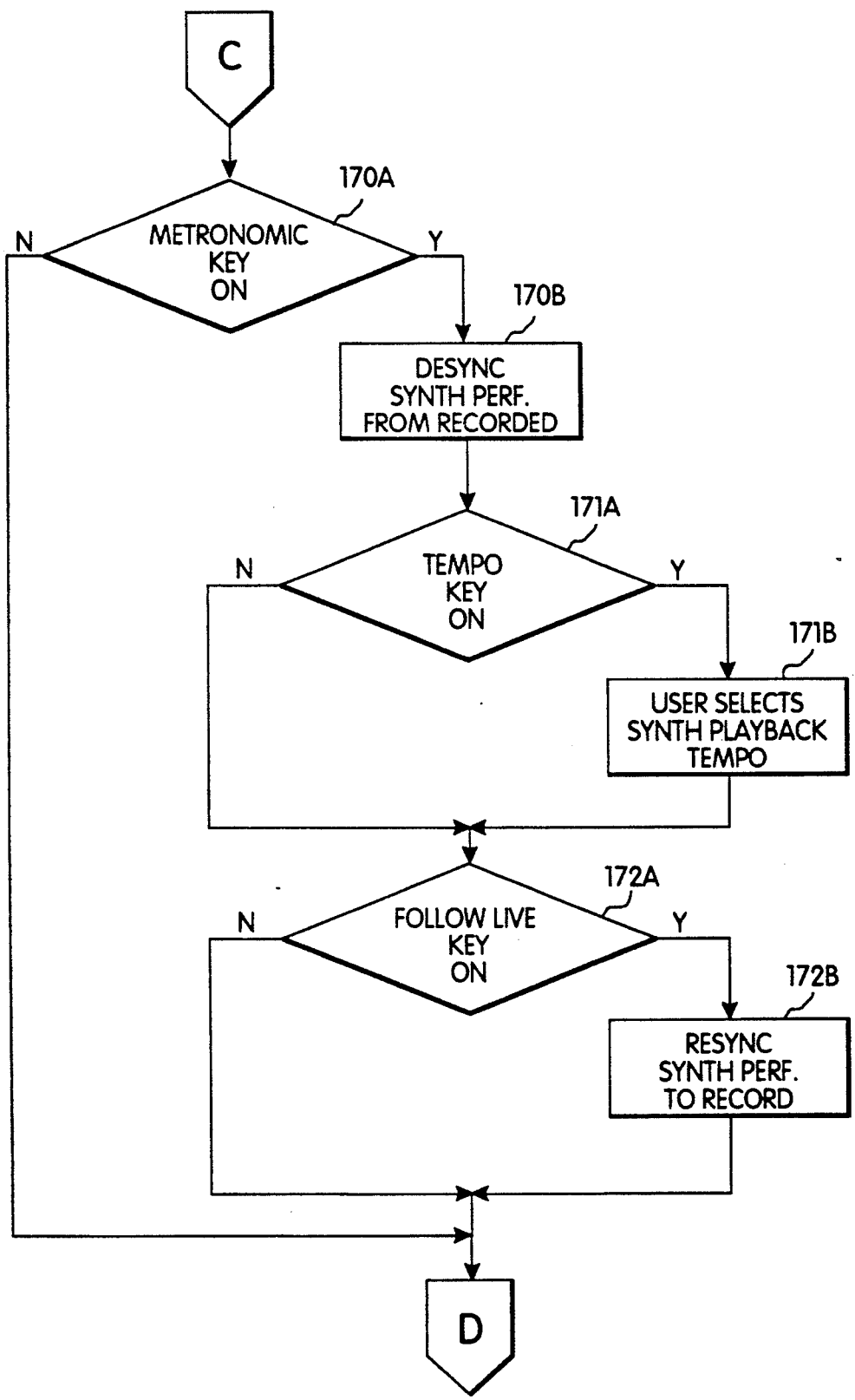
Figure 6E:
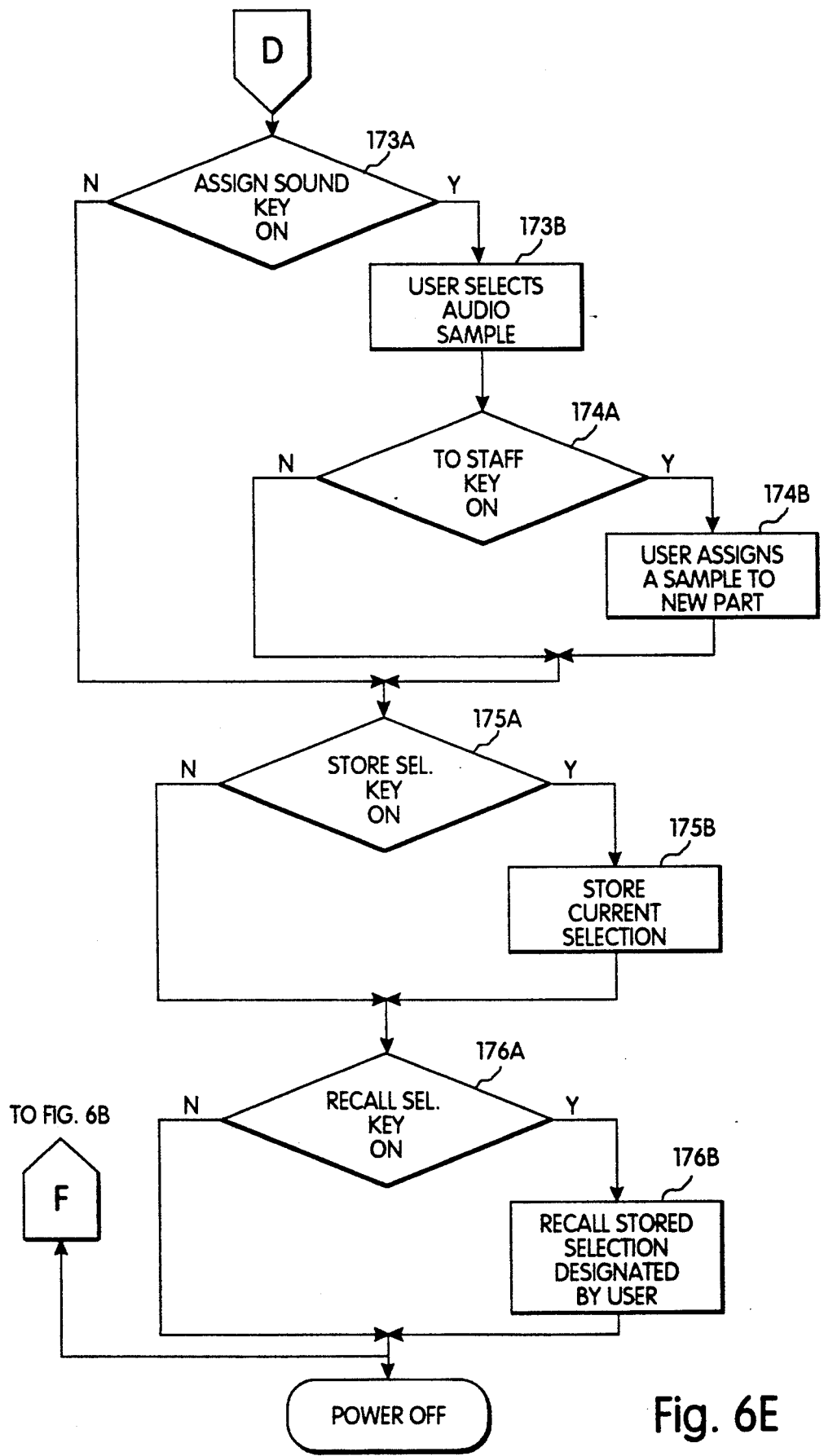

Typically, the user will next select a portion of the performance on which he desires to concentrate by engaging the BAR/BEAT key 126 followed by a number of key pad entries to instruct the system to access an exact spot in the selected performance, as shown by steps 164A–164B of FIG. 6B. Alternately, the REWIND/FORWARD key 143 may be engaged to locate the specific point in the composition, as shown by steps 164 C and 164D.

Next, the user may begin to set up a "selection" which is a sequence of user defined key sequences storable in RAM 81. Typically, the user will engage the SELECT START key 136 to designate the present bar and beat of the performance as the selection beginning, as indicated by steps 165. Next, the user may engage the SELECT END key 137 followed by a number of key pad entries to designate the last bar and beat of the selection, as indicated by steps 166. Having defined a beginning and an end of a selection of the currently loaded performance, the user may now select any number of operational sequences.

Typically, the user will next listen to the selection he or she has defined. By engaging the SYNTH key 130 followed by the PLAY key 125, the user can listen to just the synthesized performance of the loaded composition, as indicated by steps 167A, 167B, 169A and 169B of FIG. 6C. Alternately, the user could have selected the RECORDED Key 129 in steps 167C and 167D followed by the PLAY key 125 which would enable the user to hear the originally recorded performance. An even further option would be to select the OVERDUB key 131 followed by the PLAY key 125 (with the SOLO key 133 not engaged) which would enable the user to hear both the original performance and the synthesized performance, as noted by steps 167C and 167F.

The user is further able to listen to only selected parts of the synthesized performance. By engaging the SOLO key 133 followed by a number of key pad entries, the user is able to designate one or more individual instrumental parts, as shown by steps 168. Upon engaging the OVERDUB key 131 and the PLAY key 125, the user will hear the original performance in conjunction with the instrumental parts selected using the SOLO key 133.

At this point the user has selected a composition, and may listen to the composition in its entirety or just to a selected portion of the composition which he has defined. Also, the user may listen to the original performance, the synthesized performance, or both performances in unison. Additionally, the user is able to select individual instrumental parts of the composition and listen to them by themselves. For example, the user may have selected a Beethoven string quartet and defined his selection as the first 100 bars of the piece. He may then listen to the original recording, and then alternately listen to the synthesized recording. He may then, using the SOLO key 133 decide to listen to just the cello part of the piece. Upon replay of the same selection, he may decide to listen to the cello in combination with the viola part. Next, he may choose to listen to the cello in combination with the viola and one violin while attempting to play the second violin part on his own instrument from a copy of the score. It is obvious to one having musical inclinations that the abilities to compare and dissect a musical piece in such a manner is of immense educational benefit for learning or teaching musical composition, arranging, performance, and conducting.

At this point the user may decide to listen to the synthesized performance or selected instrumental parts thereof at a tempo which is slower than that of the originally recorded performance. By engaging the METRONOMIC key 128, the user disengages the synchronization of the synthesized performance to the recorded performance and causes the synthesized performance to follow the tempo designated as scored in the MIDI data, as shown by steps 170 of FIG. 6D. Next, the user may decide that the tempo of the synthesized performance as scored in the MIDI data is to fast, and, using the TEMPO key 135 followed by key pad entries, may change the playback tempo of the synthesized performance, as shown in steps 171. After having listened to the synthesized performance, or selected instrumental parts thereof, at a tempo with which user is comfortable, he may then select the FOLLOW LIVE key 127 which re-engages the synchronization of the synthesized performance to the originally recorded performance, as shown by steps 173.

The user further has the ability to re-assign different audio samples to the instrumental parts comprising the synthesized performance. By engaging the ASSIGN SOUND key 148 followed by a key pad entry and the TO STAFF key 149 follow by key pad entries, as designated by steps 173 and 174 of FIG. 6E, the user is able to assign a new audio sample, contained on ROM cartridge 14, to the designated instrumental part, thereby overriding the default audio sample assigned to that MIDI channel. In this manner the user is able to change the orchestration of the synthesized performance to facilitate a better understanding of the piece.

Returning to the above example of the Beethoven string quartet, the user may, after listening to selected parts of the synthesized performance in synchronization with the original performance, decide that he wishes to hear the violin part at a slower speed. By engaging the METRONOMIC key 128 followed by the TEMPO key 135, the user is able to specify a more desirable tempo. For example, a very fast passage in a violin instrumental part may be slowed down to a point where each distinctive note is clearly discernable. Furthermore, a slowing down of the tempo will not effect the pitch of the MIDI data as stored in RAM 81. Having listened to the selected instrumental part at a slower tempo, the user may decide that the interaction of two violin parts simultaneously is what is confusing him and not the tempo. Accordingly, the user may engage the FOLLOW LIVE key 127 which re-synchronizes the synthesized performance to the originally recorded performance.

Using the ASSIGN SOUND key 148 followed by the TO STAFF key 149, the user may assign a flute sound to the first violin part and a trumpet sound to the second violin part, thereby making each instrumental part more distinguishable than when played as programmed by the homogenous violin sounds.

Finally, the user may, at this point, store all functions which are currently engaged by depressing the STORE SELECT key 138 followed by a key pad number designating a numerical reference for the current selection, as shown by steps 175. This selection may later be recalled using the RECALL SELECT key 140 followed by a keypad entry designating the reference numeral of the desired selection as shown by steps 176, enabling the user to restore the parameters of the desired selection, namely the status of system 80 and the functions specified at the time the selection was stored.

From the above discussion it is obvious that the sequence of instructions outlined in FIGS. 6B-6E may be combined in any order, provided the steps of FIG. 6A are executed first. It is further obvious that the preceding example outlined in FIGS. 6A-6E may be modified by integrating those functions of keys previously defined but not contained therein. Accordingly, the method of using system 80 is defined as the user desires.

In light of the above discussion it is seen that the proprietary storage mediums and method of making thereof, as well as the music analysis system and method of using, as defined by the present invention, facilitate the teaching and learning of musical composition, instrumental performance, and conducting.

Having thus described one particular embodiment, various alterations, modifications and improvements will readily occur to those skilled in the art. Such alternations, modifications and improvements as are made obvious by this disclosure are intended to be part of this disclosure though not expressly stated herein, and are intended to be included in the spirit and scope of the invention. Accordingly, the foregoing description is intended to be exemplary only and not limiting. The invention is limited only as defined in the following claims and equivalents thereto.

What is claimed is:

1. An apparatus for analyzing a recorded musical performance comprising:
   memory means for storing
      a composite audio signal of a musical performance having a plurality of instrumental parts and a tempo characterized by a rhythmic sequence of beats,
      a separate digital simulation of at least selected of said instrumental parts, each of said digital simulations being generated independently of said musical performance, and
      timing data synchronized to said composite audio signal; audio output means; and
   means, coupled to said memory means and said audio output means, for selectively applying to said audio output means in synchronized playback said composite audio signal of the musical performance and at least selected of said digital simulations.

2. An apparatus as claimed in claim 1 further comprising means for controlling the temp for said digital simulations upon playback, whereby the temp for said digital simulations may be different than of said musical performance.

3. An apparatus as claimed in claim 1 further comprising means for selectively applying any one or more of said digital simulations to said audio output means in any combination.

4. An apparatus as claimed in claim 3 wherein said means for selectively applying further comprises means for applying all but a selected one of said digital simulations to said audio output means.

5. An apparatus as claimed in claim 1 further comprising means for selectively modifying the harmonic content of one or more of said digital simulations, and means for applying said modified digital simulations to said audio output means.

6. An apparatus as claimed in claim 5 wherein said modifying means includes means for re-assigning instrumental timbres to the selected one or more of said digital simulations.

7. An apparatus as claimed in claim 1 further comprising means for selectively specifying segments of said musical performance and/or said digital simulations for applications to said audio output means.

8. An apparatus as claimed in claim 1 further comprising means for selectively modifying the tempo of said digital simulations and for selectively modifying the harmonic content of one or more of said digital simulations;
means for selectively applying the modified digital simulations to said audio output means; and
means for selectively storing the modified digital simulations.

9. An apparatus as claimed in claim 8 further comprising means for printing selected portions of selected of said digital simulations, either as originally stored or as modified.

10. An apparatus as claimed in claim 8 further comprising means for printing data related to selected of said digital simulations, either as originally stored or as modified.

11. An apparatus as claimed in claim 8 further comprising means for visually displaying selected portions of selected of said digital simulations, either as originally stored or as modified.

12. An apparatus as claimed in claim 8 further comprising means for selectively applying an external audio signal to said audio output means.

13. An apparatus as claimed in claim 1 further comprising means for adding one or more additional digital simulations of said instrumental parts or new instrumental parts.

14. An apparatus as claimed in claim 8 further comprising means for entering at least one additional digital simulation to said memory means in place of or in addition to said existing digital simulations.

15. An apparatus for analyzing a recorded musical performance comprising the steps of:
providing an apparatus for analyzing a recorded musical performance, said apparatus having memory means for storing
a composite audio signal of a musical performance having a plurality of instrumental parts and a tempo characterized by a rhythmic sequence of beats,
a separate digital simulation of at least selected of said instrumental parts, each of said digital simulations being generated independently of said musical performance, and
timing data synchronized to said composite audio signal,
said apparatus further comprising audio output means, and
means, coupled to said memory means and said audio output means, for selectively applying to said audio output means in synchronized playback said composite audio signal and at least selected of said digital simulations; and
selectively applying to said audio output means in synchronized playback, said recorded performance and at least one of said digital simulations.

16. A method for analyzing a recorded musical performance as claimed in claim 15 further comprising the step of:
controlling the tempo of said at least one digital simulation, whereby the tempo of said digital simulation may be different than that of said recorded performance.

17. A method as claimed in claim 15 further comprising the step of:
selectively applying a plurality of said digital simulations to said audio output means in any desired combination.

18. A method as claimed in claim 15 further comprising the step of modifying the harmonic content of one or more of said digital simulations.

19. A method as claimed in claim 18 further comprising the step of applying said modified digital simulations to said audio output means.

20. A method as claimed in claim 15 further comprising the step of re-assigning instrumental sounds to selected ones of said digital simulations.

21. A method as claimed in claim 15 further comprising the step of selectively specifying segments of said musical performance and said digital simulations for application to said audio output means.

22. A method as claimed in claim 18 further comprising the step of storing said modified digital simulations in a second memory means.

23. A method as claimed in claim 15 further comprising the step of printing selected portions of said digital simulations.

24. A method as claimed in claim 15 further comprising the step of printing data related to selected one of said digital simulation.

25. A method as claimed in claim 15 further comprising the step of visually displaying selected portions of data relating to said digital simulations.

26. A method as claimed in claim 15 further comprising the step of visually displaying selected portions of an instrumental score representative of said digital simulations.

27. A method as claimed in claim 15 further comprising the step of selectively applying an externally generated audio signal to said audio output means.

28. A method as claimed in claim 15 further comprising the step of entering at least one digitally simulated instrumental part to said memory means.

29. A method as claimed in claim 28 wherein said one digitally simulated instrumental part is entered in said memory means in place of an existing of said digital simulations.

30. A method as claimed in claim 28 wherein said at least one additional digital simulated instrumental part is entered in said memory means in addition to an existing of said digital simulations.

31. A method as claimed in claim 15 further comprising the step of applying all but one of said digital simulations to said audio output means.

* * * * *